(12) United States Patent
Agarwal et al.

(10) Patent No.: US 11,356,458 B2
(45) Date of Patent: Jun. 7, 2022

(54) SYSTEMS, METHODS, AND COMPUTER PROGRAM PRODUCTS FOR DUAL LAYER FEDERATED IDENTITY BASED ACCESS CONTROL

(71) Applicant: MASTERCARD INTERNATIONAL INCORPORATED, Purchase, NY (US)

(72) Inventors: Asheesh Agarwal, Gujarat (IN); Nirmish Dholakia, Gujarat (IN); PiyushKumar Mistry, Gujarat (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 142 days.

(21) Appl. No.: 16/788,489

(22) Filed: Feb. 12, 2020

(65) Prior Publication Data

US 2020/0296113 A1 Sep. 17, 2020

(30) Foreign Application Priority Data

Mar. 15, 2019 (IN) .............................. 201911010257

(51) Int. Cl.
*H04L 29/06* (2006.01)
*H04L 9/32* (2006.01)
(Continued)

(52) U.S. Cl.
CPC .......... *H04L 63/105* (2013.01); *H04L 9/0861* (2013.01); *H04L 9/3213* (2013.01); *H04L 63/0876* (2013.01)

(58) Field of Classification Search
CPC . H04L 63/0876; H04L 9/0861; H04L 9/3213; H04L 63/0815; H04L 63/105
See application file for complete search history.

(56) References Cited

U.S. PATENT DOCUMENTS 7,707,120 B2  4/2010 Dominguez et al.
10,552,834 B2 * 2/2020 Dimmick .............. H04L 63/083
(Continued)

FOREIGN PATENT DOCUMENTS

KR  10-2010-0072104 A   6/2010
WO     2012046044 A1    4/2012

OTHER PUBLICATIONS

Singh, H., "Examination Report", IN Application No. 201911010257, dated Jan. 15, 2021, 6 pages.
(Continued)

*Primary Examiner* — Mohammad A Siddiqi

(57) ABSTRACT

The invention provides methods, systems and computer programs for dual layer identity based access control implemented within systems that implement a micro-service architecture. The invention involves (i) receiving at a first resource server (a) a request for a first processor implemented service, (b) a primary access token generated by the primary identity authentication server, and (c) validation information corresponding to the primary access token that is transmitted by the primary identity authentication server, (iv) responsive confirming validity of the primary access token, transmitting to a secondary identity authentication server, a request for generation of a secondary access token, (v) receiving the secondary access token at the first resource server, and (vi) transmitting to a second resource server within the server system, a request for a second processor implemented service implemented by said second resource server.

20 Claims, 12 Drawing Sheets

(51) Int. Cl.
  *H04L 9/08*    (2006.01)
  *H04L 9/40*    (2022.01)

(56) References Cited

U.S. PATENT DOCUMENTS

| | | | |
|---|---|---|---|
| 10,657,242 B1* | 5/2020 | Xia | G06F 21/35 |
| 2005/0114701 A1 | 5/2005 | Atkins et al. | |
| 2006/0015358 A1* | 1/2006 | Chua | G06Q 20/02 |
| | | | 705/44 |
| 2012/0072979 A1 | 3/2012 | Cha et al. | |
| 2013/0086381 A1 | 4/2013 | Thomas et al. | |
| 2014/0282989 A1 | 9/2014 | Young et al. | |
| 2016/0127352 A1 | 5/2016 | Xu et al. | |
| 2016/0283740 A1* | 9/2016 | Roundtree | H04L 51/14 |
| 2018/0020005 A1 | 1/2018 | Beiter et al. | |
| 2018/0115554 A1 | 4/2018 | Dyon et al. | |
| 2018/0302391 A1* | 10/2018 | Jones | H04L 63/083 |
| 2019/0058706 A1* | 2/2019 | Feijoo | H04L 63/0807 |

OTHER PUBLICATIONS

Kim, Sung Hee, "International Search Report and Written Opinion of the International Searching Authority", International Application No. PCT/US2020/020067, dated Jun. 26, 2020, 9 pages.

\* cited by examiner

SYSTEMS, METHODS, AND COMPUTER PROGRAM PRODUCTS FOR DUAL LAYER FEDERATED IDENTITY BASED ACCESS CONTROL

CROSS-REFERENCE TO RELATED APPLICATION

This application claims priority to Indian Patent Application No. 201911010257, filed Mar. 15, 2019, entitled "Systems, Methods, and Computer Program Products for Dual Layer Federated Identity Based Access Control", the entirety of which is incorporated herein by reference.

FIELD OF THE INVENTION

The present invention relates to the field of federated identity based access control, and more specifically to methods, systems and computer programs for dual layer identity based access control implemented within systems that adhere to a micro-service architecture.

BACKGROUND OF THE INVENTION

Micro-service architectures are increasingly implemented as a standard of choice for software-as-a-service or network based or cloud based systems architectures. A micro-service architecture consists of a collection of discrete, autonomous services, each provided by a distinct service resource or service provider. Each service resource is self-contained and is typically configured to implement a single business capability. Basic features of a micro-service architecture include (i) services that are small, independent, and loosely coupled, each service being structured as a separate codebase, (ii) each individual service can be deployed independently, (iii) each existing service can be updated or modified without rebuilding and redeploying the entire application, (iv) services are responsible for persisting their own data or external state, (vi) services communicate with each other by using well-defined application programming interfaces (APIs), (vii) internal implementation details of each service are hidden from other services, and (viii) services don't necessarily to share the same technology stack, libraries, or frameworks.

FIG. 1 illustrates an exemplary system environment 100 that implements a micro-service architecture based server system 106 for providing network based services. As shown in FIG. 1, system environment 100 can be used for providing network based services to a user requesting such services from a terminal device 102. In certain embodiments of the present invention, system 100 may be modified to implement the invention.

System environment 100 includes terminal device 102, network 104, and a micro-service architecture based server system 106. Systems of the type shown in FIG. 1 can be used to implement any micro-service architecture based service offering, including without limitation network based payment services, electronic transaction services, mobile payment services and electronic wallet services.

Terminal device 102 may comprise any processor implemented data processing device having network communication capabilities, and may in exemplary instances include a computer 102a, smartphone 102b, or any other mobile or non-mobile data processing and/or data communication device.

As shown in FIG. 1, the micro-service architecture based server system 106 may be communicably coupled with terminal device 102 through network 104—which network 104 may comprise any communication network (for example, the internet).

Server system 106 comprises a gateway interface 1062 configured to enable devices that are external to said server system 106 (for example, terminal device 102) to communicate with individual resource servers within server system 106. Server system 106 includes a plurality of resource servers—i.e. resource server 1 (1064), resource server 2 (1066), and resource server 3 (1068)—each of which comprises a processor implemented instance of a logical server configured to implement a discrete logical application (i.e. a discrete micro-service) within server system 106.

As shown in FIG. 1, in addition to being configured to communicate with terminal device 102 through gateway interface 1062 and network 104, each resource server 1064 to 1068 may be configured to communicate with each other—for example, through defined call-response mechanisms using one or more APIs. Accordingly, in responding to a request for a micro-service from a requesting terminal device 102, one or more of resource servers 1064 to 1068 may transmit a service request to one of the other resource servers—and may receive from said one of the other resource servers, a micro-service provided by such other resource server. It would be understood that the inter resource server communication (within the micro-service architecture based server system 106) is typical essential aspect of the micro-service architecture, and the present invention facilitates an identity authentication and access control requirement that particularly arises in connection with this characteristic of micro-service architectures—which requirement is discussed in more detail hereinbelow.

Network based authentication and access control systems routinely require authentication of user identity using user names and passwords (or other authentication mechanisms). Over time a user may accumulate a large number of usernames and passwords, for user authentication in order to access different websites or different network services. For example, a user may have one username/password combination that is used to access a social networking site, another username/password combination that is used to access an email site, and a third username/password combination for a banking or credit card site. While multiple username/password combinations may be necessary for user authentication, users find it difficult to remember each username/password combination—especially since passwords for each site require to be changed periodically, and often are mandatorily required to be different from one or more last used passwords.

A solution to simplify authentication across multiple websites/service providers is to rely on a federated identity authentication and access control system (also known as a single sign-on (SSO) solution). A federated identity authentication and access control system relies on a trusted identity verification platform—with which a user may be registered based on a registration process that (i) assigns a unique username/password combination to the user, and (ii) that may optionally involve some form of prior identity verification of the user. Subsequently, when a user seeks to log in or access a third party website or service, the user is directed to enter the assigned username/password combination at the trusted identity verification platform—and pursuant to authentication of the user's identity (based on the entered username/password combination) the trusted identity verification platform generates and transmits to the user an access token containing encoded information. In an embodiment, the access token may include one or more of, a unique token ID (which unique token ID has been associated or linked with the identity of the user in the records of the trusted identity verification platform, a session ID associated with the access token, an access token expiration time, and one or more access permissions that may have been specified in connection with the access token. In certain embodiments, the access token may be encrypted—for example, using public key-private key encryption mechanisms.

This access token may be transmitted to the third party website or service, which verifies the user identity through the information within the received access token. Verification of the user identity based on the received access token may include the third party website or service requesting the trusted identity verification platform to validate the received access token. Responsive to validation of the received access token by the trusted identity verification platform and subsequent verification of the user identity by the third party website or service based on the validated access token, the user may be granted access to the third party website or service. By relying on a federated identity authentication and access control system of this type, a user may avoid the necessity of registering separately with each third party website or service provider, and of remembering and having to enter a large number of usernames/password combinations. Simultaneously, third party websites or service providers can ensure secure and reliable identity authentication and access control services from the trusted identity verification platform—without having to invest in and replicate local infrastructure for implementing such identity authentication and access control services.

Examples of existing protocols for federated identity authentication systems include the OpenID protocol, the Liberty Alliance protocol, the Open Authentication (OAUTH) protocol, the Security Assertion Markup Language, the Identity Assurance Framework, and the like—any of which may be implemented for the purposes of setting up a federated identity authentication solution of the type discussed above.

FIG. 2 illustrates an implementation of a federated identity authentication solution for the purpose of providing identity authentication and/or access control in a system environment 200 that implements a micro-service architecture based server system for providing network based services.

As in the case of FIG. 1, system environment 200 includes terminal device 202 (which may in exemplary instances include a computer 202a, smartphone 202b, or any other mobile or non-mobile data processing and/or data communication device), network 204, and a micro-service architecture based server system 206. System environment 200 additionally includes a federated identity authentication server 208. Both, server system 206 and federated identity authentication server 208 may be communicably coupled with terminal device 202 (and with each other) through network 204—which network 204 may comprise any communication network (for example, the internet).

Server system 206 comprises a gateway interface 2062 configured to enable devices that are external to said server system 206 (for example, terminal device 202 or federated identity authentication server 208) to communicate with individual resource servers within server system 206. Server system 206 includes a plurality of resource servers—i.e. resource server 1 (2064), resource server 2 (2066), up to resource server n (206n)—each of which comprises a processor implemented instance of a logical server configured to implement a discrete logical application/discrete micro-service within server system 206. As discussed in connection with FIG. 1, in addition to being configured to communicate with a terminal device 202 through gateway interface 2062 and network 204, each of resource servers 2064 to 206n may be configured to communicate with each other—for example, through defined call-response mechanisms using one or more APIs.

Federated identity authentication server 208 comprises a trusted server configured to register users based on a registration process that (i) assigns a unique username/password combination to the user, and (ii) that may optionally involve some form of prior identity verification of the user. When a user seeks to log in or access one or more resource servers (i.e. micro-services) 2064 to 206n within server system 206 (for example, through terminal 202), the user may be directed to enter the assigned username/password combination at the federated identity authentication server 208—and subsequent to authentication of the user's identity (based on the entered username/password combination), the federated identity authentication server 208 generates and transmits to the user an access token containing information verifying the user identity.

This access token may be transmitted to server system 206 or to a specific resource server 2064 to 206n, within server system 206, which access token serves to verify the user identity through the information within said access token. Subject to verification of the user identity based on the information the received access token, the user may be granted access to the requested resource server or micro-service.

It has however been found that due to the fact that internal service calls between resource servers is inherent to a micro-service architecture, responding to a user request for a micro-service from one resource server within server system 206 may involve the requested resource server generating resource server calls on one or more other resource servers within server system 206—as a result of which, a single service request generated by terminal device 202 on any one resource server 2064 to 2064n may involve a series of nested internal resource server calls generated within server system 2062.

Since, as part of their internal process flows, each of resource servers 2064 to 206n may be configured to require identity authentication of the requesting user, each internal resource server call within a series of nested internal resource server calls would trigger a new identity authentication workflow involving federated identity authentication server 208.

This is illustratively shown in the communication flow diagram of FIG. 3, which shows multiple identity authentication request process flows involving a federated identity authentication server, that may be initiated when a server system responding to a client request is based on a micro-service architecture. The communication flow illustrated in FIG. 3 involves communication flows between a terminal device 302, resource servers 1 2, and n (3062, 3064, 306n) comprising micro-service resource servers implemented within a server system, and a federated identity authentication server 308.

At step 3002 terminal device transmits to resource server 1, a request for a first resource or service that is made available by resource server 1 (3062). Resource server 1 (3062) responds to the received request by determining whether an access token verifying the identity of a requesting user has been included with the request transmitted at step 3002. In the embodiment illustrated in FIG. 3, resource server 1 (3062) determines that an access token verifying the identity of a requesting user has not been included with the request transmitted at step 3002, and responsive to this determination, at step 3004 transmits a request for authentication and/or authorization of the user to terminal device 302.

At step 3006, terminal device 302 transmits to federated identity authentication server 308, a request for generation of an access token—which request may include identity verification data of the user (for example a username/password combination of the user, that is registered with federated identity authentication server 308). Responsive to receiving said request and identity verification data, federated identity authentication server 308 verifies the identity of the requesting user (for example based on the transmitted username/password combination) and at step 3008 transmits back to terminal device 302 a generated access token—wherein data in the generated access token serves as authentication data corresponding to the identity of the requesting user.

At step 3010 terminal device 302 transmits the received access token to resource server 1 (3062) in response to the request for authentication and/or authorization that has been received from resource server 1 (3062) at step 3004.

At step 3012 resource server 1 (3062) transmits to federated identity authentication server 308, an access token validity verification request, seeking from federated identity authentication server 308, verification that the access token received at step 3010 is a valid access token. Said request may be accompanied by the access token for which validation is requested. Federated identity authentication server 308 verifies validity of the access token, and responsive to confirming that the access token is valid, at step 3014 transmits an access token validity confirmation message back to resource server 1 (3062).

Responsive to receiving confirmation of the access token validity from federated identity authentication server 308, resource server 1 (3062) initiates a process flow associated with the requested first resource. In the embodiment being explained herein, the process flow associated with the requested first resource includes access to a second resource implemented or made available by resource server 2 (3064). Accordingly, as part of the process flow associated with the requested first resource, at step 3016 resource server 1 (3062) transmits a request for the second resource to resource server 2 (3064)—which request is accompanied by the access token received from terminal device 302.

At step 3018, resource server 2 (3064) transmits to federated identity authentication server 308, an access token validity verification request, seeking from federated identity authentication server 308, verification that the access token received at step 3016 is a valid access token. Said request may be accompanied by the access token for which validation is requested. Federated identity authentication server 308 verifies validity of the access token, and responsive to confirming that the access token is valid, at step 3020 transmits an access token validity confirmation message back to resource server 2 (3064).

Responsive to receiving confirmation of the access token validity from federated identity authentication server 308, resource server 2 (3064) initiates a process flow associated with the requested second resource. In the embodiment being explained herein, the process flow associated with the requested second resource includes access to an nth resource implemented or made available by resource server n (306n). Accordingly, as part of the process flow associated with the requested second resource, at step 3022 resource server 2 (3064) transmits a request for the nth resource to resource server n (306n)—which request is accompanied by the access token received from resource server 1.

At step 3024, resource server n (306n) transmits to federated identity authentication server 308, an access token validity verification request, seeking from federated identity authentication server, verification that the access token received at step 3022 is a valid access token. Said request may be accompanied by the access token for which validation is requested. Federated identity authentication server 308 verifies validity of the access token, and responsive to confirming that the access token is valid, at step 3026 transmits an access token validity confirmation message back to resource server n (306n).

Responsive to receiving confirmation of the access token validity from federated identity authentication server 308, resource server n (306n) initiates a process flow associated with the requested nth resource. Upon completion of the process flow associated with the nth resource, at step 3028 resource server n (306n) transmits an nth response back to resource server 2. Likewise, (i) upon completion of the process flow associated with the second resource, at step 3030 resource server 2 (3064) transmits a second response to resource server 1, and (ii) upon completion of the process flow associated with the first resource, at step 3032 resource server 1 (3062) transmits a first response back to terminal device 302.

As would be apparent from the communication flow diagram illustrated in FIG. 3, each nested resource server call (generated by another resource server) within the micro-service architecture based server system results in a new call-response exchange between the responding resource server and the federated identity authentication server 308. This presents certain problems including a significant increase in network traffic, overloading of the federated identity authentication server, significant increases in service time latency if the federated identity authentication server is slow to respond, and an overall slow down in response time—principally due to the fact that external communications with the federated identity authentication server are likely to be over public networks, which involve lower throughput bit rates when compared to high speed bit rates that can be achieved within a local network or internally within the server system that implements the illustrated micro-service architecture.

There is accordingly a need for a solution that enables implementation of federated identity authentication, which addresses the above problems.

SUMMARY

The invention relates to methods, systems and computer programs for dual layer identity based access control implemented within systems that implement a micro-service architecture.

The invention provides a system for implementing a dual layer authentication for identity authentication or access control. The system comprises a processor implemented server system communicably coupled with a primary identity authentication server, the server system comprising a plurality of resource servers and a secondary identity authentication server, wherein said server system is configured to (i) receive at a first resource server within the server system, a request for a first processor implemented service implemented by said first resource server, (ii) receive at the first resource server, a primary access token generated by the primary identity authentication server corresponding to an identity of a requestor that has generated the request for the first processor implemented service, (iii) receive at the first resource server, validation information transmitted by the primary identity authentication server, said validation information corresponding to the primary access token, (iv) responsive to the received validation information confirming validity of the primary access token, transmit from the first resource server to the secondary identity authentication server, a request for generation of a secondary access token corresponding to the identity of the requestor that has generated the request for the first processor implemented service, (v) receive at the first resource server, the secondary access token requested from and generated by the secondary identity authentication server, and (vi) implement one or more processes associated with the first processor implemented service requested from the first resource server, wherein said one or more processes includes transmitting to a second resource server within the server system, a request for a second processor implemented service implemented by said second resource server.

The system may be configured such that (i) the first resource server transmits to the second resource server (a) the request for the second processor implemented service implemented by said second resource server, and (b) the secondary access token, (ii) the second resource server (c) receives validation information transmitted by the secondary identity authentication server, said validation information corresponding to the secondary access token, and (d) responsive to the received validation information confirming validity of the secondary access token, implements one or more processes associated with the second processor implemented service requested from the second resource server.

One or more or each of the plurality of resource servers within the server system may comprise a processor implemented instance of a logical server configured to implement a discrete logical application.

The first resource server may be configured to receive the request for the first processor implemented service from a terminal device communicably coupled to the system.

In an embodiment of the system, the validation information corresponding to the primary access token is received by the first resource server in response to a first validation request sent to the primary identity authentication server from the first resource server.

In another system embodiment, the request for generation of the secondary access token transmitted from the first resource server to the secondary identity authentication server is accompanied by transmission of the primary access token from the first resource server to the secondary identity authentication server.

The system may be configured such that the secondary access token is generated by the secondary identity authentication server responsive to the secondary identity authentication server receiving from primary identity authentication server, confirmation of validity of the primary access token.

In a particular system embodiment, the confirmation of validity of the primary access token is received from the primary identity authentication server at the secondary identity authentication server, in response to a second validation request sent to the primary identity authentication server from the second identity authentication server.

The primary identity authentication server may be external to the server system and may be communicably coupled with the server system.

In a system embodiment (i) the data throughput rate between the secondary identity authentication server and one or more of the plurality of resource servers within the server system is higher than the data throughput rate between the primary identity authentication server and the one or more of the plurality of resource servers within the server system, or (ii) the maximum data transmission rate between the secondary identity authentication server and one or more of the plurality of resource servers within the server system is higher than the maximum data transmission rate between the primary identity authentication server and the one or more of the plurality of resource servers within the server system.

The system may be configured such that the secondary access token defines one or more secondary token access permissions that are identical to or based on one or more primary token access permissions defined by the primary access token.

The invention additionally provides a method for implementing a dual layer authentication for identity authentication or access control. The method comprises (i) receiving at a first resource server within a server system, a request for a first processor implemented service implemented by said first resource server, (ii) receiving at the first resource server, a primary access token generated by a primary identity authentication server corresponding to an identity of a requestor that has generated the request for the first processor implemented service, wherein the primary identity authentication server is communicably coupled with the server system, (iii) receiving at the first resource server, validation information transmitted by the primary identity authentication server, said validation information corresponding to the primary access token, (iv) responsive to the received validation information confirming validity of the primary access token, transmitting from the first resource server to a secondary identity authentication server within the server system, a request for generation of a secondary access token corresponding to the identity of the requestor that has generated the request for the first processor implemented service, (v) receiving at the first resource server, the secondary access token requested from and generated by the secondary identity authentication server, and (vi) implementing one or more processes associated with the first processor implemented service requested from the first resource server, wherein said one or more processes includes transmitting to a second resource server within the server system, a request for a second processor implemented service implemented by said second resource server.

In a method embodiment (i) the first resource server transmits to the second resource server (a) the request for the second processor implemented service implemented by said second resource server, and (b) the secondary access token, and (ii) the second resource server (c) receives validation information transmitted by the secondary identity authentication server, said validation information corresponding to the secondary access token, and (d) responsive to the received validation information confirming validity of the secondary access token, implements one or more processes associated with the second processor implemented service requested from the second resource server.

In a method embodiment, each of the plurality of resource servers comprises a processor implemented instance of a logical server configured to implement a discrete logical application.

In a particular embodiment of the method, the first resource server is configured to receive the request for the first processor implemented service from a terminal device communicably coupled to the system.

In a further embodiment of the method, the validation information corresponding to the primary access token is received by the first resource server in response to a first validation request sent to the primary identity authentication server from the first resource server.

According to one method embodiment, the request for generation of the secondary access token transmitted from the first resource server to the secondary identity authentication server is accompanied by transmission of the primary access token from the first resource server to the secondary identity authentication server.

In a specific implementation of the method of the present invention, the secondary access token is generated by the secondary identity authentication server responsive to the secondary identity authentication server receiving from primary identity authentication server, confirmation of validity of the primary access token.

In another method embodiment, the confirmation of validity of the primary access token is received from the primary identity authentication server at the secondary identity authentication server, in response to a second validation request sent to the primary identity authentication server from the second identity authentication server.

The primary identity authentication server may be external to the server system and may be communicably coupled with the server system.

In an embodiment of the method (i) the data throughput rate between the secondary identity authentication server and one or more of the plurality of resource servers within the server system is higher than the data throughput rate between the primary identity authentication server and the one or more of the plurality of resource servers within the server system, or (ii) the maximum data transmission rate between the secondary identity authentication server and one or more of the plurality of resource servers within the server system is higher than the maximum data transmission rate between the primary identity authentication server and the one or more of the plurality of resource servers within the server system.

For the purposes of implementing the method in accordance with the present invention, the secondary access token may define one or more secondary token access permissions that are identical to or based on one or more primary token access permissions defined by the primary access token.

The invention additionally provides a computer program product for implementing a dual layer authentication for identity authentication or access control. The computer program product comprises a non-transitory computer usable medium having a computer readable program code embodied therein, the computer readable program code comprising instructions for implementing within a processor based computing system, any of the method steps described in accordance with the present invention, including without limitation one or more of (i) receiving at a first resource server within a server system, a request for a first processor implemented service implemented by said first resource server, (ii) receiving at the first resource server, a primary access token generated by a primary identity authentication server corresponding to an identity of a requestor that has generated the request for the first processor implemented service, wherein the primary identity authentication server is communicably coupled with the server system, (iii) receiving at the first resource server, validation information transmitted by the primary identity authentication server, said validation information corresponding to the primary access token, (iv) responsive to the received validation information confirming validity of the primary access token, transmitting from the first resource server to a secondary identity authentication server within the server system, a request for generation of a secondary access token corresponding to the identity of the requestor that has generated the request for the first processor implemented service, (v) receiving at the first resource server, the secondary access token requested from and generated by the secondary identity authentication server, and (vi) implementing one or more processes associated with the first processor implemented service requested from the first resource server, wherein said one or more processes includes transmitting to a second resource server within the server system, a request for a second processor implemented service implemented by said second resource server.

BRIEF DESCRIPTION OF THE ACCOMPANYING DRAWINGS

DETAILED DESCRIPTION

The present invention provides mechanisms for dual layer identity authentication (including without limitation, dual layer federated identity authentication) based access control implemented within systems that implement micro-service architecture(s). The invention may in various embodiments be used to implement authentication and/or access control within any micro-service architecture based service offering(s), including network based payment services, electronic transaction services, mobile payment services and electronic wallet services.

Figure 4:
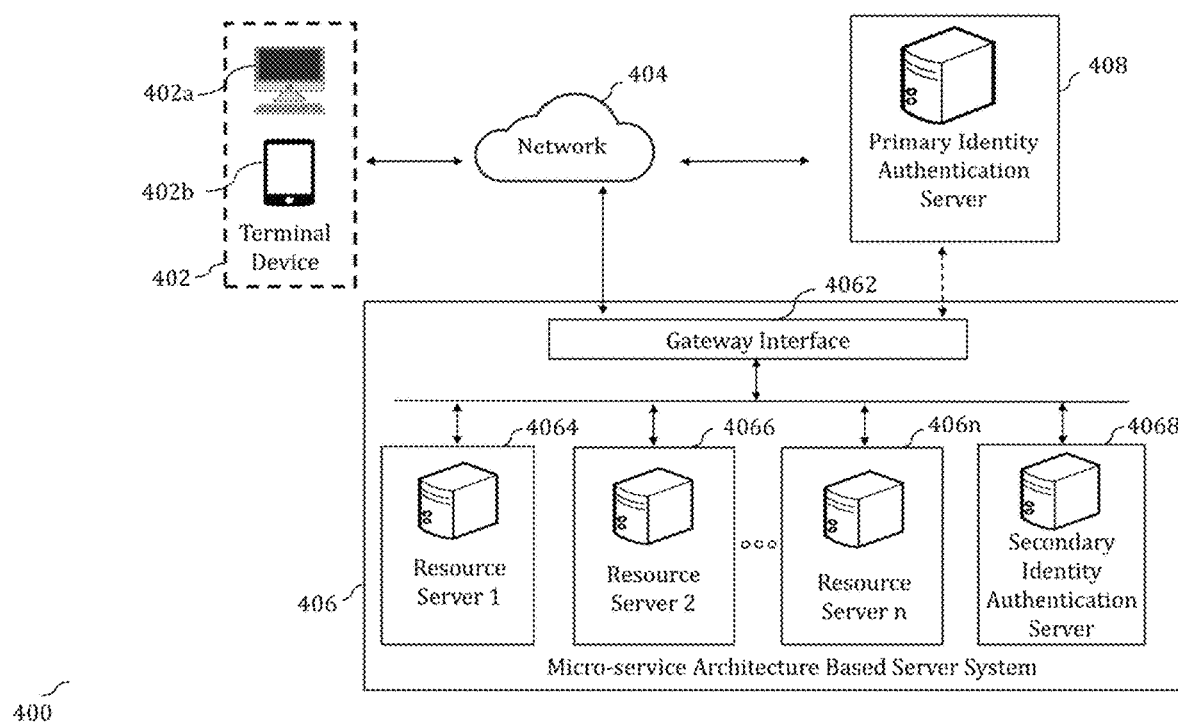
FIG. 4 illustrates a system environment in accordance with the present invention, where a micro-services architecture based system relies on a dual layer authentication mechanism for identity authentication and/or access control.

FIG. 4 illustrates a system environment 400 in accordance with the present invention, where a micro-service architecture based system relies on a dual layer authentication arrangement for identity authentication and/or access control. In a non-limiting embodiment, the system environment 400 may be used to implemented a dual layer authentication arrangement for federated identity authentication and/or access control.

Figure 3:
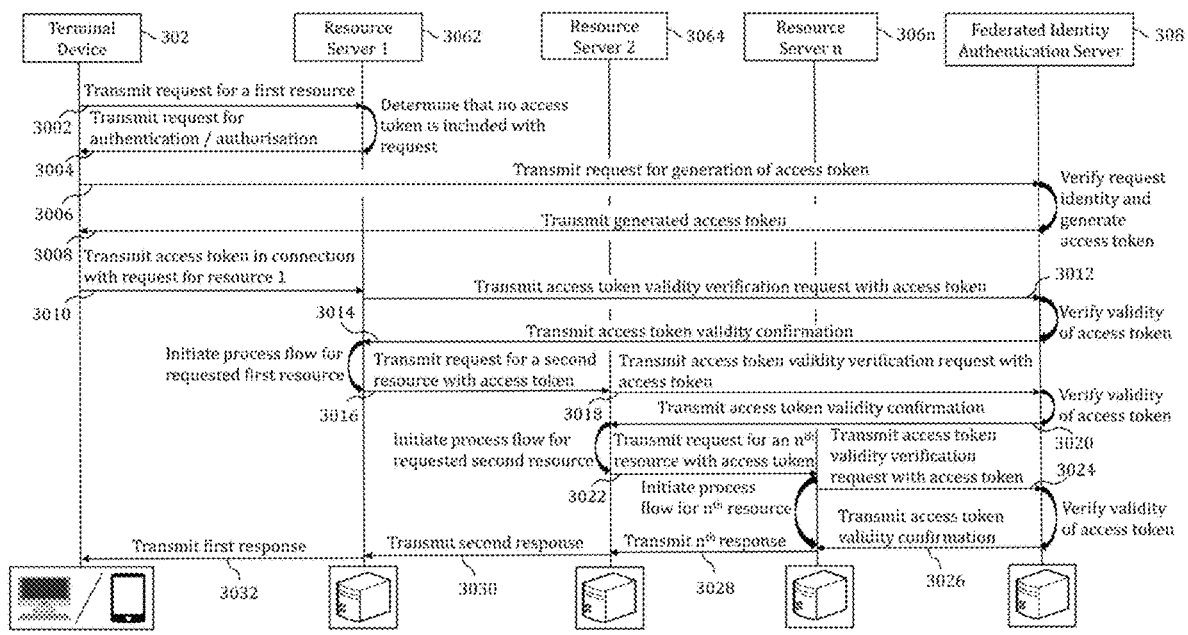
FIG. 3 is a communication flow diagram illustrating communication flow between system entities within the system environment of FIG. 2.

As in the case of FIG. 3, system environment 400 includes terminal device 402 (which may in exemplary instances include a computer 402a, smartphone 402b, or any other mobile or non-mobile data processing and/or data communication device), network 404, and a micro-service architecture based server system 406. System environment 400 additionally includes a primary identity authentication server 408. In a non-limiting embodiment, primary identity authentication server 408 may comprise a federated identity authentication server. Both of server system 406 and primary identity authentication server 408 may be communicably coupled with terminal device 402 through network 404—which network 404 may comprise any communication network (for example, the internet).

Figure 1:
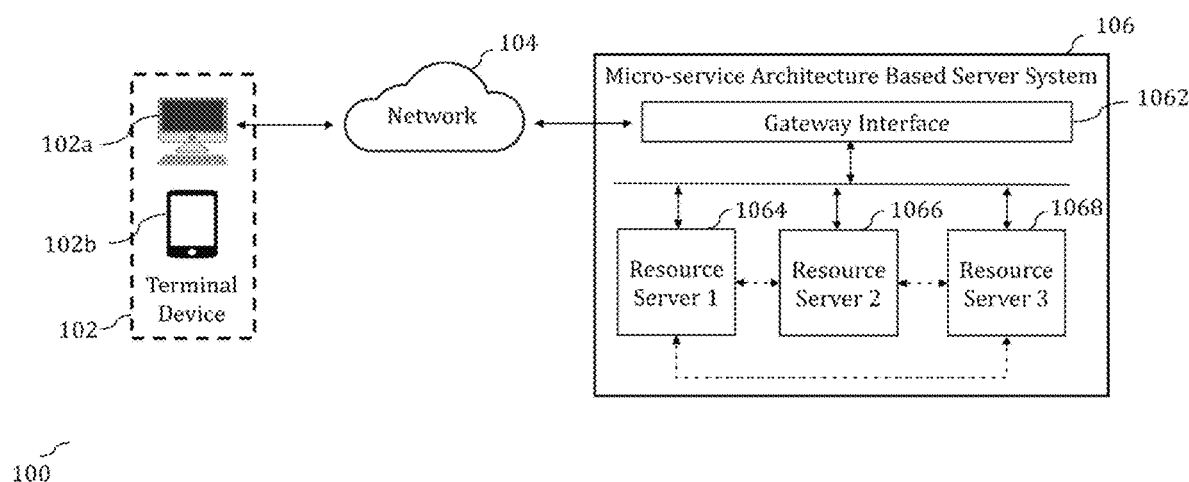
FIG. 1 illustrates a prior art system environment for network based services through a micro-service architecture based server system.
Figure 2:
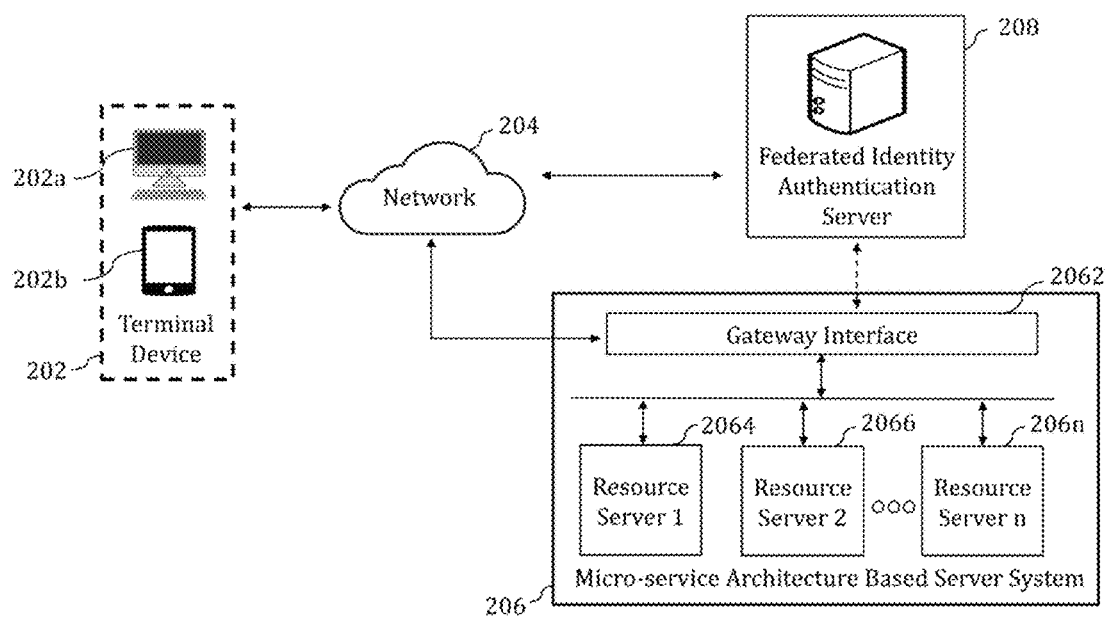
FIG. 2 illustrates a system environment where a micro-services architecture based server system relies on a federated identity authentication server for the purposes of enabling identity authentication and/or access control.

Server system 406 comprises a gateway interface 4062 configured to enable devices that are external to said server system 406 (for example, terminal device 402) to communicate with individual resource servers within server system 406. Server system 406 includes a plurality of resource servers—i.e. resource server 1 (4064), resource server 2 (4066), up to resource server n (406n)—each of which comprises a processor implemented instance of a logical server configured to implement a discrete logical application/discrete micro-service within server system 406. As discussed in connection with FIG. 2, in addition to being configured to communicate with a terminal device 402 through gateway interface 4062 and network 404, each resource server 4064 to 406n may be configured to communicate with each other through—for example, through defined call-response mechanisms using one or more APIs.

Server system 406 also includes a secondary identity authentication server 4068, the configuration and functionality whereof will be explained in detail below.

Primary identity authentication server 408 comprises a trusted server configured to register users based on a registration process that (i) assigns a unique username/password combination to the user, and (ii) that may optionally involve some form of prior identity verification of the user.

When a user seeks to log in or access one or more resource servers (i.e. micro-services) within micro server system 406 (for example, through terminal 402), the user may be directed to enter the assigned username/password combination at the primary identity authentication server 408—and subsequent to authentication of the user's identity (based on the entered username/password combination) the primary identity authentication server 408 generates and transmits to the user a primary access token containing information verifying the user identity. In an embodiment, the primary access token may include one or more of, a unique token ID (which unique token ID has been associated or linked with the identity of the user in the records of the trusted identity verification platform, a session ID associated with the primary access token, a primary access token expiration time, and one or more access permissions that may have been specified in connection with the primary access token. In certain embodiments, the primary access token may be encrypted—for example, using public key-private key encryption mechanisms.

This primary access token may be transmitted by the user to server system 406 or to a first resource server within server system 406 (which first resource server is selected from among resource servers 1 to n (4064 to 406n)) which is configured to provide the resource or micro-service requested by the user. The first resource server may verify the user identity through the information within the received primary access token. In an embodiment, the first resource server may first obtain validation of the received primary access token by transmitting said token to primary identity authentication server 408, along with a request for validation of said primary access token. Responsive to validation of the received primary access token by primary identity authentication server 408, and additionally responsive to verification of the user identity through the received primary access token, the first resource server initiates a first process flow necessary to provide to the requesting user, access to the requested resource or micro-service.

As part of the first process flow, the first resource server transmits to secondary identity authentication server 4068, a request for generation of a secondary access token—and may additionally transmit the primary access token to the secondary identity authentication server 4068. Responsive to receiving the request for generation of a secondary access token, the secondary identity authentication server 4068 may first verify the identity of the user responsible for generation of the service request on the first resource server—which verification may comprise requesting and receiving from primary identity authentication server 408, validation of the received primary access token. Thereafter, secondary identity authentication server 4068 generates a secondary access token and transmits the secondary access token back to the first resource server. The secondary access token may in an embodiment be based on information extracted from the primary access token, and in a particular embodiment the validity and/or access permissions associated with the secondary access token may be identical to, or otherwise based on or corresponding to the validity and/or access permissions associated with the primary access token. In an embodiment, the generated secondary access token may be associated with or linked to the primary access token in a database record maintained by the secondary identity authentication server 4068. In an embodiment, the secondary access token may include one or more of, a unique token ID (which unique token ID has been associated or linked with the identity of the user in the records of the trusted identity verification platform, a session ID associated with the secondary access token, a secondary access token expiration time, and one or more access permissions that may have been specified in connection with the secondary access token. In certain embodiments, the secondary access token may be encrypted—for example, using public key-private key encryption mechanisms.

Thereafter, when as part of the first process flow, the first resource server requires a micro-service provided by a second resource server within server system 406, said first resource server generates an intra-system call (i.e. that is internal to that server system 406), requesting the second resource server within server system 406 for a micro-service provided by such second resource server. In the embodiment being explained herein, the process flow associated with the intra-system call transmitted to the second resource server includes access to a second resource implemented or made available by the second resource server. Said intra-system call may in an embodiment be accompanied be accompanied by transmission of the secondary access token received by the first resource server from the secondary identity authentication server 4068.

The second resource server receives the intra-system call from the first resource server, and verifies the identity of the user responsible for generation of the intra-system call (i.e. the user who initiated the request on the first resource server), by transmitting to the secondary identity authentication server 4068, an access token validity verification request—seeking from secondary identity authentication server 4068, verification that the secondary access token is a valid access token. Said request may be accompanied by the secondary access token for which validation is requested.

The secondary identity authentication server 4068 receives the access token validity verification request, verifies the secondary access token, and responsive to confirming that the secondary access token is valid, transmits an access token validity confirmation message back to the second resource server.

Responsive to receiving confirmation of the secondary access token's validity from the secondary identity authentication server 4068, the second resource server initiates a process flow associated with a second resource that has been requested by the first resource server through the intra-system call.

It would be understood that the mechanism for implementing an intra-system call, including the steps of (i) transmitting the intra-system call and the secondary access token from a calling resource server to a called resource server, (ii) verification of the validity of the secondary access token at the called resource server by querying the secondary identity authentication server and (iii) responsive to confirmation of validity of the secondary access token by the secondary identity authentication server, initiating a process flow associated with a resource that has been requested by the calling resource server through the intra-system call—would apply to each nested intra-system call that is generated as a consequence of implementing a first process flow associated with a first resource server (including intra-system calls that are generated by resource servers that have been called by the first resource server or any other called resource server). It would be further understood that the secondary access token only requires to be generated in response to a request by the first resource server, and that each, and that every nested intra-system call generated at the first resource server or at any resource server (within server system 406) that has been subsequently called as part of a nested intra-system call pursuant to execution of a process flow at a first server resource may use the same secondary access token for the purpose of user identity authentication and/or access control.

It would be understood that as a consequence of implementing the above mechanisms, the server system 406 only requires to communicate with the primary identity authentication server 408 once for the purposes of the initial verification of the primary access token received from terminal device 402, and that thereafter all other identity verification process flows can be implemented through secondary identity authentication server 4068. As a consequence of the fact that the secondary identity authentication server 4068 is located in-system, or is a secondary identity authentication server that is dedicated to serving the requirements of server system 406, this arrangement offers several advantages over the prior art including—reducing network traffic between server system 406 and primary identity authentication server 408, avoiding overloading of identity authentication server 408, avoiding server time latency in case the identity authentication server 408 is slow to respond, and avoiding response slowdowns due to low network throughputs between identity authentication server 408 and server system 406. In a particular embodiment, server system 406 may be particularly configured such that (i) the data throughput rate between one or more resource servers within server system 406 and the secondary identity authentication server 4068 is higher than the data throughput rate between one or more resource servers within server system 406 and the primary identity authentication server 408 or (ii) the maximum data transmission rate between one or more resource servers within server system 406 and the secondary identity authentication server 4068 is higher than the maximum data transmission rate between one or more resource servers within server system 406 and the primary identity authentication server 408.

The invention as described above is discussed in more detail in connection with FIGS. 5 to 12.

Figure 5:
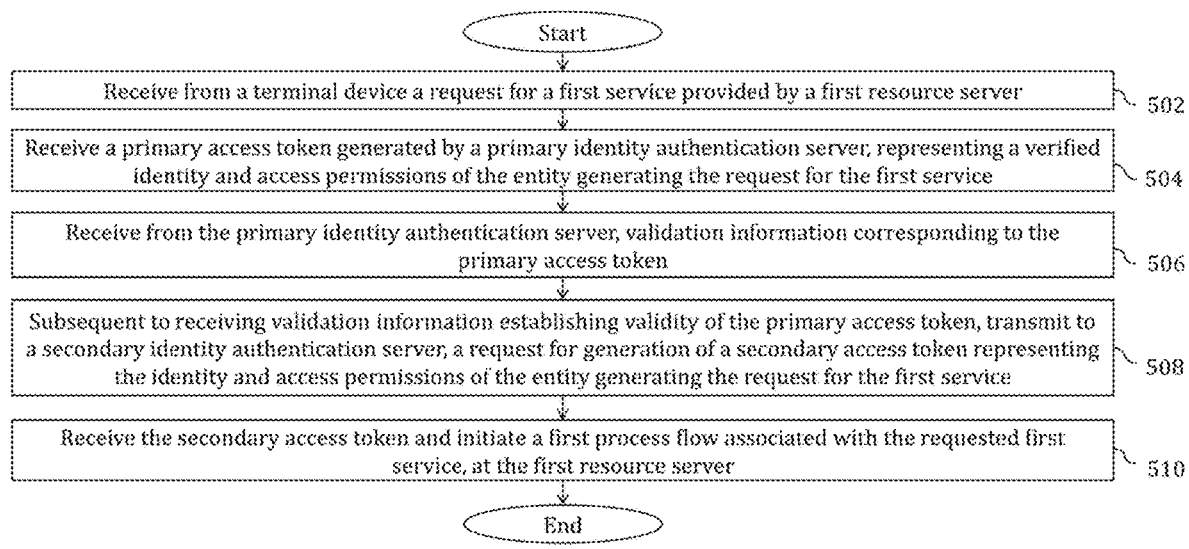
FIG. 5 illustrates a method of generating primary and secondary access tokens within a system environment that relies on a dual layer authentication arrangement for identity authentication and/or access control.

FIG. 5 illustrates a method of generating primary and secondary access tokens within a system environment that relies on a dual layer authentication arrangement for identity authentication and/or access control. In an embodiment, the method of FIG. 5 may be implemented within server system 406 of FIG. 4. In a more particular embodiment, the method of FIG. 5 may be implemented within any of the one or more resource servers 4064 to 406n within server system 406.

Step 502 comprises receiving (from a terminal device 402) at a first resource server within server system 406, a request for a first resource or first service that is made available by server system 406 through said first resource server.

Step 504 comprises receiving at said first resource server, a primary access token generated by primary identity authentication server 408—said primary access token representing a verified identity and/or access permissions associated with the entity or user that has generated the request for the first service. In an embodiment, said primary access token may be generated in response to the user or requesting entity providing an assigned username/password combination at the primary identity authentication server 408—wherein subsequent to authentication of the user or requesting entity's identity (based on the entered username/password combination) the primary identity authentication server 408 generates and transmits to the user a primary access token containing information verifying the user identity.

Step 506 comprises receiving from primary identity authentication server 408, validation information corresponding to the primary access token. It would be understood that said validation information may be received in response to a query transmitted from the first resource server to the primary identity authentication server 408, requesting validation of the primary access token received at the first resource server.

At step 508, subsequent to the first resource server receiving validation information confirming validity of the primary access token, said first resource server transmits to secondary identity authentication server 4068, a request for generation of a secondary access token representing the verified identity and/or access permissions associated with the entity or user that has generated the request for the first service. In an embodiment, the request for generation of the secondary access token may be accompanied by transmission of the primary access token to secondary identity authentication server 4068. In another embodiment, the request for generation of the secondary access token is not accompanied by transmission of the primary access token to secondary identity authentication server 4068.

In an embodiment of the invention where the request for generation of the secondary access token is accompanied by transmission of the primary access token to secondary identity authentication server 4068, responsive to receiving the request for generation of a secondary access token, the secondary identity authentication server 4068 may first verify the identity of the user responsible for generation of the service request on the first resource server—which verification may comprise requesting and receiving from primary identity authentication server 408, validation of the received primary access token. Alternatively, in an embodiment where the request for generation of the secondary access token is not accompanied by transmission of the primary access token to secondary identity authentication server 4068, this verification step may be omitted entirely. Thereafter, secondary identity authentication server 4068 generates a secondary access token and transmits the secondary access token back to the first resource server. In a particular embodiment of the invention where the request for generation of the secondary access token is accompanied by transmission of the primary access token to secondary identity authentication server 4068, one or more secondary token access parameters defined by the generated secondary access token may be based on one or more primary token access parameters defined by the primary access token, and in a particular embodiment the secondary token access parameters and/or validity and/or access permissions associated with the secondary access token may be identical to, or otherwise based on or corresponding to the primary token access parameters and/or validity and/or access permissions associated with the primary access token. In an embodiment, the generated secondary access token may be associated with or linked to the primary access token in a database record maintained by the secondary identity authentication server 4068. It would be understood that in an embodiment where the request for generation of the secondary access token is not accompanied by transmission of the primary access token to secondary identity authentication server 4068, the secondary access token may be generated based on one or more secondary access token generation rules accessible by secondary identity authentication server 4068.

At step 510, the first resource server receives the secondary access token, and initiates a first process flow associated with the requested first service—which first process flow may include generation and transmission of an intra-system call requesting a second resource server for a resource/micro-service provided by such second resource server.

Figure 6:
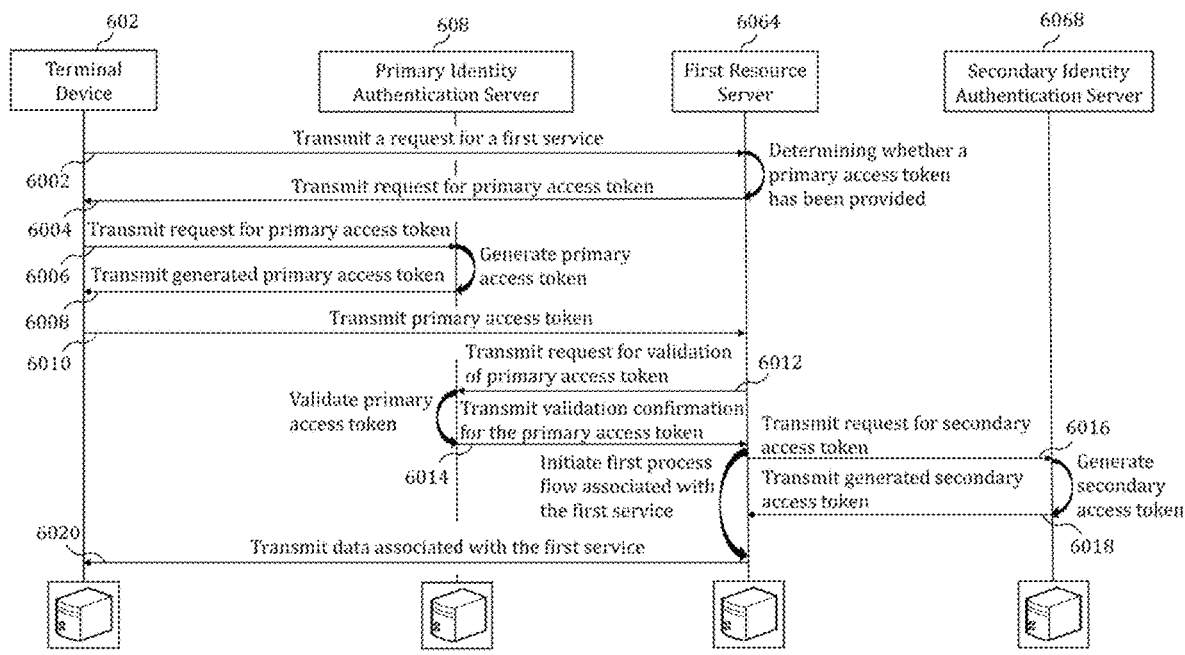
FIG. 6 is a communication flow diagram illustrating communication flow between system entities for implementing the method of FIG. 5.

FIG. 6 is a communication flow diagram illustrating communication flow between system entities for implementing the method of FIG. 5.

As illustrated in FIG. 6, the method commences at step 6002 with terminal device 602 transmitting to first resource server 6064 (i.e. a first resource server within server system 406 of FIG. 4), a request for a first service/first resource that first resource server 6064 is configured to provide. First resource server 6064 ascertains whether the transmitted request includes a primary access token for validating the identity of the requesting entity or user. At step 6004, responsive to determining that the transmitted request does not include a primary access token, first resource server 6064 transmits to terminal device 602, a request for a primary access token that enables validation of identity of the requesting entity or user.

At step 606, terminal device 602 transmits a request for a primary access token to primary identity authentication server 608—which request may be accompanied by a username/password combination (or other form of identity verification information) associated with the requesting entity/user. Subsequent to authentication of the requesting entity/user's identity (based on the entered username/password combination or other identity verification information) the primary identity authentication server 608 generates a primary access token containing information verifying the requesting entity/user identity, and at step 6008 transmits the generated primary access token to terminal device 602.

Step 6010 comprises transmitting from terminal device 602 to first resource server 6064, the received primary access token.

At step 6012, first resource server 6064 transmits to primary identity authentication server 608, a request for validation of the primary access token received from terminal device 602. Said request may be accompanied by transmission of the primary access token from first resource server 6064 to primary identity authentication server 608. Primary identity authentication server 608 may execute a validation process in respect to the received primary access token, and subject to said primary access token being determined to be a valid access token, may at step 6014 transmit to first resource server 6064, validation confirmation corresponding to the primary access token that has been received from the first resource server 6064.

Responsive to receiving validation confirmation of the received primary access token from primary identity authentication server 608, and additionally responsive to verification of the requesting entity/user's identity based on the information within the received primary access token, first resource server 6064 initiates a first process flow necessary to provide to terminal device 602, access to the requested first service/first resource that has been requested from first resource server 6064.

As part of the first process flow, at step 6016, the first resource server transmits to secondary identity authentication server 6068, a request for generation of a secondary access token—and may optionally or additionally transmit the primary access token to the secondary identity authentication server 6068. Responsive to receiving the request for generation of a secondary access token, the secondary identity authentication server 6068 may optionally (i.e. in the embodiment where the request for generation of the secondary access taken is accompanied by transmission of the primary access token to the secondary identity authentication server 6068) first verify the identity of the entity/user responsible for generation of the service request on the first resource server—which verification may comprise requesting and receiving from primary identity authentication server 608, validation of the received primary access token. In an alternate embodiment where the request for generation of the secondary access taken is not accompanied by transmission of the primary access token to the secondary identity authentication server 6068, this verification step may be omitted. Secondary identity authentication server 4068 then generates a secondary access token, and at step 6018, transmits the secondary access token back to first resource server 6064. The secondary access token may in an optional embodiment be based on information extracted from the primary access token, and in a particular embodiment the secondary token access parameters and/or validity and/or access permissions associated with the secondary access token may be identical to, or otherwise based on or corresponding to the primary token access parameters and/or validity and/or access permissions associated with the primary access token. In a further optional embodiment, the generated secondary access token may be associated with or linked to the primary access token in a database record maintained by the secondary identity authentication server 6068.

Subsequent to receiving the generated secondary access token from secondary identity authentication server 6068, first resource server 6064 completes further steps of the process flow associated with the requested first service, and at step 6020, transmits to terminal device 602, data associated with the requested first service.

Figure 7:
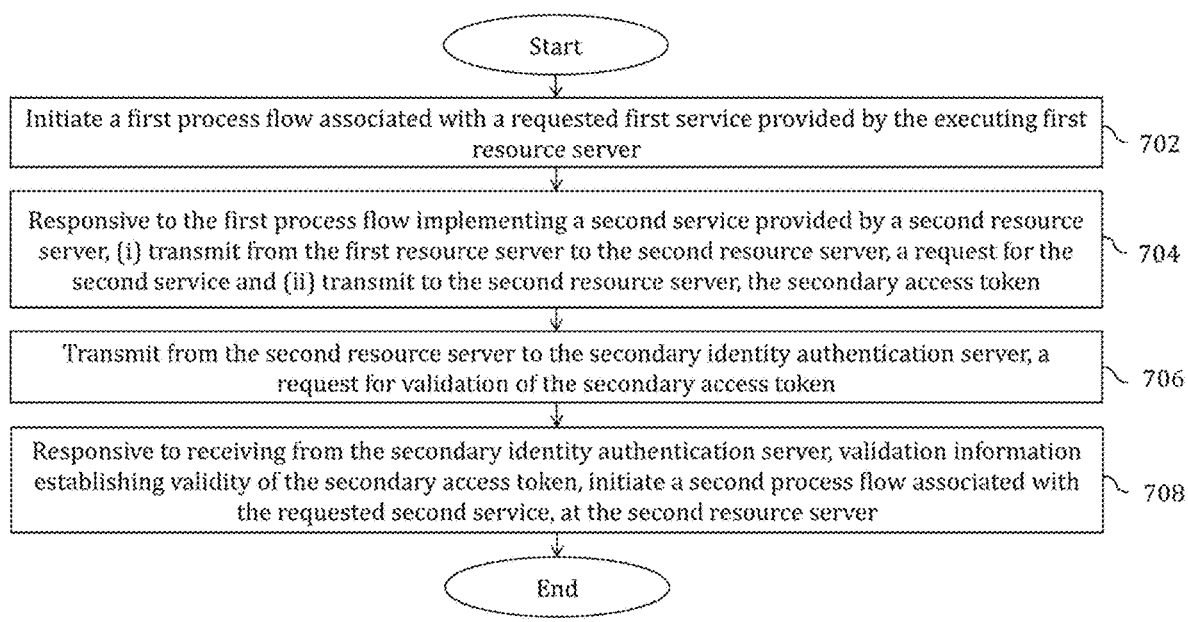
FIG. 7 illustrates a method of utilizing a secondary access token that has been generated in accordance with the method of FIG. 5, for the purpose of dual layer identity authentication and/or access control.

FIG. 7 illustrates a method of utilizing a secondary access token that has been generated in accordance with the method of FIG. 5, for the purpose of dual layer identity authentication and/or access control. In an embodiment, the method of FIG. 7 may be implemented within server system 406 of FIG. 4. In a more particular embodiment, the method of FIG. 7 may be implemented within any of the one or more resource servers 4064 to 406*n* within server system 406. In an embodiment, the method of FIG. 7 describes in further detail steps involved in implementing step 510 of FIG. 5 that has been discussed hereinabove.

Step 702 comprises initiating at a first resource server that is configured for executing or providing a first service (that has been requested by a terminal device 402), a first process flow associated with said first service. In an embodiment, the first process flow at step 702 is a process flow that has been initiated at step 510 of FIG. 5, pursuant to prior implementation of each of the previous steps 502 to 508 of FIG. 5.

At step 704, responsive to the initiated first process workflow implementing a second service provided by a second resource server, the first resource server (i) transmits to the second resource server, a request for the second service, and (ii) transmits to the second resource server, the secondary access token that has been received from the secondary identity authentication server at step 510 of FIG. 5. In one embodiment, step 704 may additionally include transmission to the second resource server, the primary access token that the first resource server has received from primary identity authentication server 408 in connection with the initiated first process workflow. In another embodiment, step 704 may omit transmission to the second resource server, of the primary access token that the first resource server has received from primary identity authentication server 408 in connection with the initiated first process workflow.

Thereafter, step 706 comprises transmitting from the second resource server to secondary identity authentication server 4068, a request for validation of the secondary access token.

At step 708, responsive to receiving (from secondary identity authentication server 4068) validation information confirming or establishing validity of the secondary access token, a second process flow associated with the requested second service is initiated at the second resource server.

It would be understood that the method of FIG. 7 can be implemented each time an intra-system call is generated by one resource server for a resource or service provided by another resource server. In an embodiment of the invention, a terminal device 402 may transmit to server system 406, a request for a first service provided by a first resource server, wherein the process flow associated with the first server resource involves a nested set of intra-system calls, each nested intra-system call involving a further request for a service provided by a resource server within server system 406. In this embodiment, provision of the first service by the first resource server may involve implementation of method steps 502 to 510 of FIG. 5, while provision of services responding to each nested intra-system call may involve implementation of method steps 702 to 708 of FIG. 7.

Figure 8:
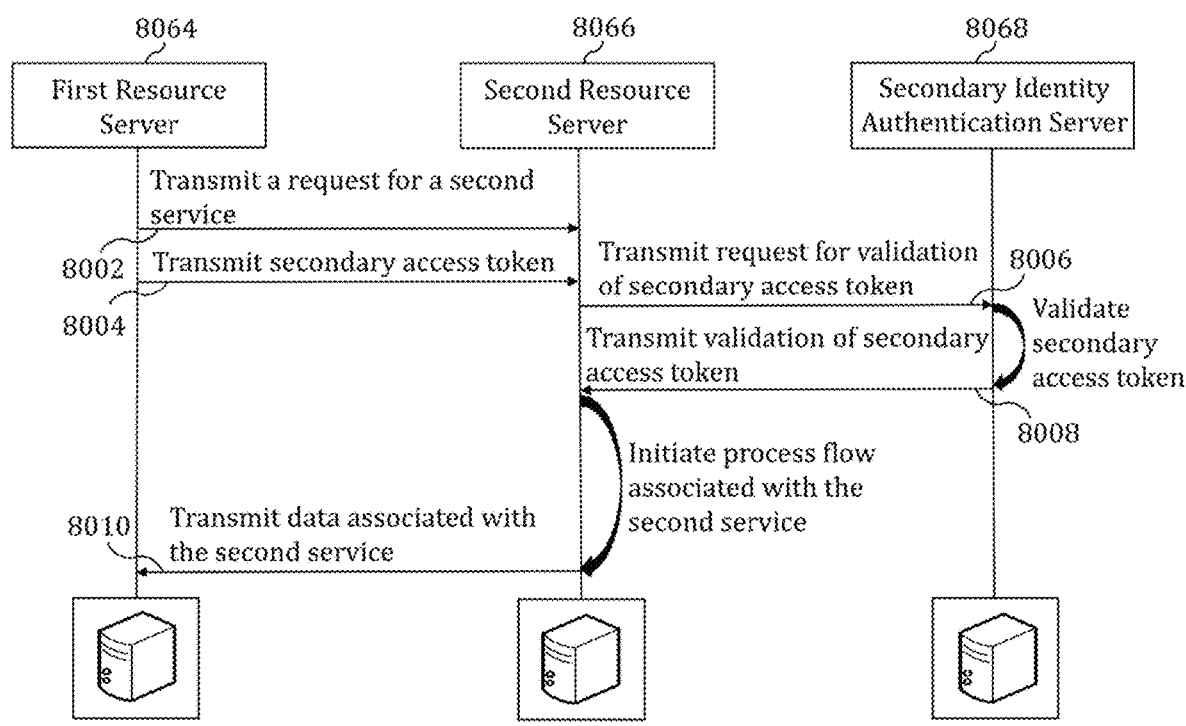
FIG. 8 is a communication flow diagram illustrating communication flow between system entities for implementing the method of FIG. 7.

FIG. 8 is a communication flow diagram illustrating communication flow between system entities for implementing the method of FIG. 7.

As illustrated in FIG. 8, the method commences at step 8002 with first resource server 8064 (i.e. a first resource server within server system 406 of FIG. 4) transmitting to second resource server 8066 (i.e. a second resource server within server system 406 of FIG. 4), a request for a second service/second resource that first resource server 8064 requires for executing a process flow associated with the first service/first resource. At step 8004, first resource server 8064 transmits to second resource server 8066 a secondary access token (that has been obtained by the first resource server 8064 at step 510 of FIG. 5). In one embodiment, step 8004 may additionally include transmission from first resource server 8064 to second resource server 8066, the primary access token that first resource server 8064 has received from a primary identity authentication server in connection with the initiated first process workflow. In another embodiment, step 8004 may omit transmission from first resource server 8064 to second resource server 8066, the primary access token that first resource server 8064 has received from a primary identity authentication server in connection with the initiated first process workflow.

At step 8006, second resource server 8066 transmits a request for validation of the received secondary access token to secondary identity authentication server 8068.

Secondary identity authentication server 8068 validates the received secondary access token based on examination of said secondary access token and/or comparison of the secondary access token with one or more access tokens previously generated by the secondary authentication server 8068. Thereafter at step 8008, subject to the secondary access token being successfully validated, secondary identity authentication server 8068 transmits to second resource server 8066, a message or data confirming the successful validation of the secondary access token.

Responsive to receiving validation of the secondary access token, second resource server 8066 initiates a process flow associated with the requested second service, and at step 8010 transmits to the requesting first resource server 8064, data associated with the second service.

Figure 9:
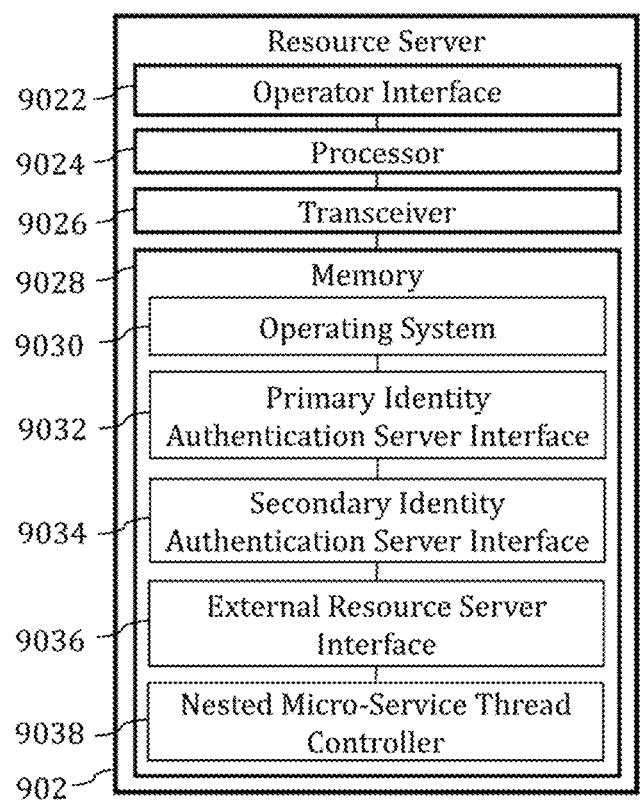
FIG. 9 illustrates an exemplary embodiment of a resource server of a type that may be implemented within a micro-services architecture based server system that relies on a dual layer authentication arrangement for identity authentication and/or access control.

FIG. 9 illustrates an exemplary embodiment of a resource server of a type that may be implemented within a microservices architecture based server system that relies on a dual layer authentication arrangement for identity authentication and/or access control.

Resource server 902 may comprise any processor implemented instance of a logical server configured to implement a discrete logical application/discrete micro-service within server system 406 of FIG. 4. In specific embodiments, resource server 902 may include an operator interface 9022, processor 9024, communication transceiver 9026 and memory 9028, which memory 9028 may include transitory memory and/or non-transitory memory. In an exemplary embodiment, memory 9028 may have stored therewithin, (i) an operating system 9030 configured for managing device hardware and software resources and that provides common services for software programs implemented within resource server 902, (ii) a primary identity authentication server interface 9032 comprising a network communication interface configured to enable communication between resource server 902 and a primary identity authentication server (for example, primary identity authentication server 408 of FIG. 4), (iii) a secondary identity authentication server interface 9034 comprising a network communication interface configured to enable communication between resource server 902 and a secondary identity authentication server (for example, secondary identity authentication server 4068 of FIG. 4), (iv) external resource server interface 9036, comprising a communication interface configured to enable communication between resource server 902 and one or more other resource servers (for example, one or more other resource servers within server system 406 of FIG. 4), and (v) nested micro-service thread controller 9038 comprising a controller configured to control execution of one or more nested micro-service process threads that may be executed pursuant to one or more process flows required by resource server 902 for providing a specific resource or micro-service.

Figure 10:
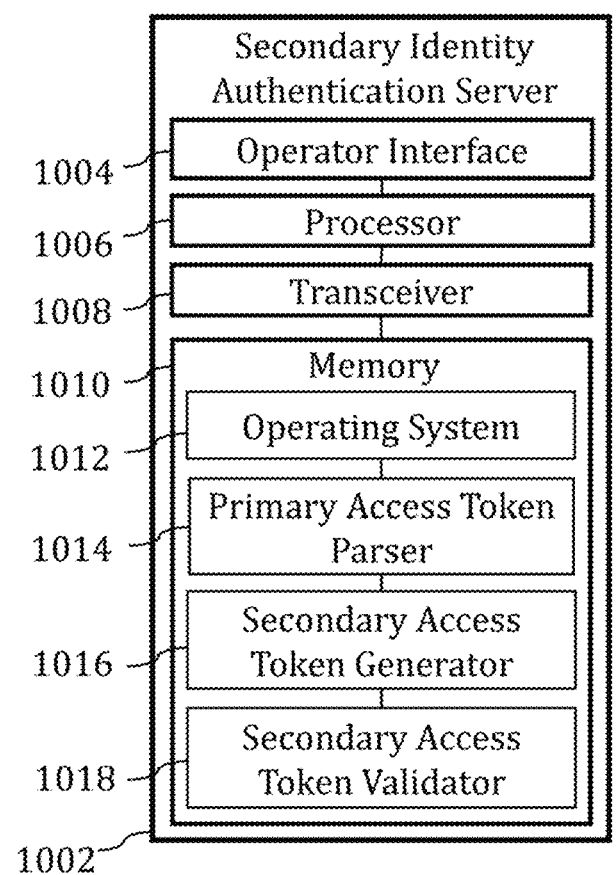
FIG. 10 illustrates an exemplary embodiment of a secondary identity authentication server of a type that may be implemented within a micro-services architecture based server system that relies on a dual layer authentication arrangement for identity authentication and/or access control.

FIG. 10 illustrates an exemplary embodiment of a secondary identity authentication server of a type that may be implemented within a micro-services architecture based server system that relies on a dual layer authentication arrangement for identity authentication and/or access control.

Secondary identity authentication server 1002 may comprise any processor implemented server configured to implement the functionality of a secondary identity authentication server (for example, a secondary identity authentication server 4068 of FIG. 4). In specific embodiments, secondary identity authentication server 1002 may include an operator interface 1004, processor 1006, communication transceiver 1008 and memory 1010, which memory 1010 may include transitory memory and/or non-transitory memory. In an exemplary embodiment, memory 1010 may have stored therewithin, (i) an operating system 1012 configured for managing device hardware and software resources and that provides common services for software programs implemented within secondary identity authentication server 1002, (ii) a primary access token parser 1014 configured to parse or otherwise extract information from a received primary access token, for the purpose of generating a secondary access token, (iii) a secondary access token generator 1016 configured for generating a secondary access token in response to receiving a request for generating a secondary access token from a resource server, and (iv) a secondary access token validator 1018 configured for generating confirming or establishing validity of a secondary access token received from one or more resource servers— which confirmation may be effected based on examination of the secondary access token data and/or based on a comparison between the received secondary access token and one or more access tokens previously generated by secondary identity authentication server 1002.

Figure 11:
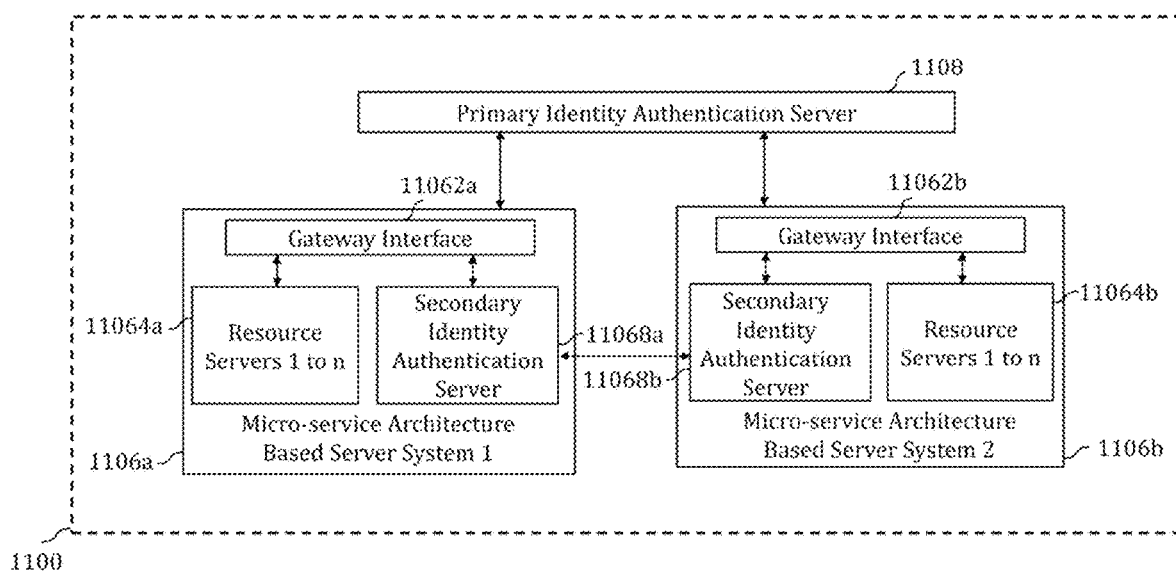
FIG. 11 illustrates an exemplary embodiment of a system environment wherein a distributed dual layer authentication arrangement for identity authentication and/or access control may be implemented across a plurality of a micro-service architecture based server systems.

FIG. 11 illustrates an exemplary embodiment of a system environment wherein a distributed dual layer authentication arrangement for identity authentication and/or access control may be implemented across a plurality of a micro-services architecture based server systems.

The system environment of FIG. 11 illustrates a specific embodiment of the invention configured to be implemented where multiple instances of a server system comprising a gateway interface, resource servers 1 to n, and a secondary identity authentication server, may be set up—for example, for the purposes of load balancing, load distribution, or servicing local data centers or local data clusters or localized network regions. In the embodiment shown in FIG. 11, two such micro-service architecture based server systems have been implemented—namely a micro-service architecture based server system 1 (1106*a*) and micro-service architecture based server system 2 (1106*b*).

Micro-service architecture based system 1 (1106*a*) comprises gateway interface 11062*a*, resource servers 1 to n (11064*a*) and secondary identity authentication server 11068*a*). Micro-service architecture based system 2 (1106*b*) comprises gateway interface 11062*b*, resource servers 1 to n (11064*b*) and secondary identity authentication server 11068*b*). Each of micro-service architecture based server system 1 (1106*a*) and micro-service architecture based server system 2 (1106*b*) may be configured to operate in accordance with the teachings discussed above in connection with server system 406 of FIG. 4.

As in the case of server system 406 of FIG. 4, each of micro-service architecture based server system 1 (1106*a*) and micro-service architecture based server system 2 (1106*b*) may be communicatively coupled with primary identity authentication server 1108—to enable said system(s) to confirm the validity of a primary access token received from any terminal device requesting a resource or service from a resource server within said system(s).

In addition, secondary identity authentication server 11068*a* (within micro-service architecture based server system 1 (1106*a*)) is configured for network based communication with secondary identity authentication server 11068*b* (within micro-service architecture based server system 2 (1106*b*))—and may be configured to periodically synchronize data states (including secondary access tokens recorded with each secondary identity authentication server) across said plurality of secondary identity authentication servers, which ensures that a secondary access token generated within one of said plurality of server systems can be recognized and/or utilized by resource servers within any of the other server systems within said plurality of server systems.

It would be understood that one or more of the server systems (comprising resource servers and secondary identity authentication systems) of the type described in connection with FIGS. 4 and 11, the methods and communication flows of the type described in connection with FIGS. 5 to 8, resource servers of the type described in connection with FIG. 9, and secondary identity authentication servers of the type described in FIG. 10, may be used to implement any micro-service architecture based service offering, including without limitation network based payment services, electronic transaction services, mobile payment services and electronic wallet services. In an embodiment, one or more of the above may be implemented within a payment network, issuer network, or financial service provider network, or within one or more servers implemented within a payment network, issuer network, or financial service provider network.

Figure 12:
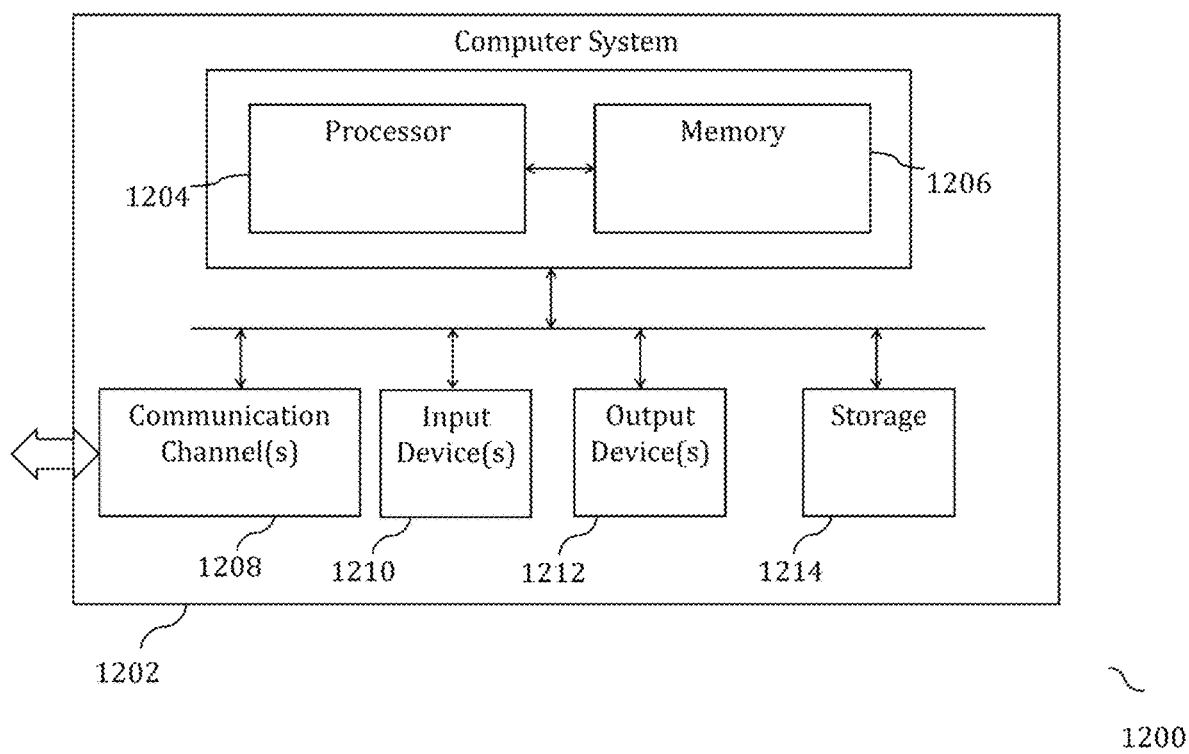
FIG. 12 illustrates an exemplary computer system according to which various embodiments of the present invention may be implemented.

FIG. 12 illustrates an exemplary computer system according to which various embodiments of the present invention may be implemented.

System 1200 includes computer system 1202 which in turn comprises one or more processors 1204 and at least one memory 1206. Processor 1204 is configured to execute program instructions—and may be a real processor or a virtual processor. It will be understood that computer system 1202 does not suggest any limitation as to scope of use or functionality of described embodiments. The computer system 1202 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1202 in accordance with the present invention may include one or more servers, desktops, laptops, tablets, smart phones, mobile phones, mobile communication devices, tablets, phablets and personal digital assistants. In an embodiment of the present invention, the memory 1206 may store software for implementing various embodiments of the present invention. The computer system 1202 may have additional components. For example, the computer system 1202 may include one or more communication channels 1208, one or more input devices 1210, one or more output devices 1212, and storage 1214. An interconnection mechanism (not shown) such as a bus, controller, or network, interconnects the components of the computer system 1202. In various embodiments of the present invention, operating system software (not shown) provides an operating environment for various softwares executing in the computer system 1202 using a processor 1204, and manages different functionalities of the components of the computer system 1202.

The communication channel(s) 1208 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1210 may include, but is not limited to, a touch screen, a keyboard, mouse, pen, joystick, trackball, a voice device, a scanning device, or any another device that is capable of providing input to the computer system 1202. In an embodiment of the present invention, the input device(s) 1210 may be a sound card or similar device that accepts audio input in analog or digital form. The output device(s) 1212 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1202.

The storage 1214 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1202. In various embodiments of the present invention, the storage 1214 may contain program instructions for implementing any of the described embodiments.

In an embodiment of the present invention, the computer system 1202 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1202. The method described herein is typically implemented as a computer program product, comprising a set of program instructions that is executed by the computer system 1202 or any other similar device. The set of program instructions may be a series of computer readable codes stored on a tangible medium, such as a computer readable storage medium (storage 1214), for example, diskette, CD-ROM, ROM, flash drives or hard disk, or transmittable to the computer system 1202, via a modem or other interface device, over either a tangible medium, including but not limited to optical or analogue communications channel(s) 1208. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers significant advantages—in particular, by significantly reducing the requirement for access token validation communications between resource servers within a server system and a identity authentication server that is external to said server system, thereby (i) reducing load on the external identity authentication server, reducing external network traffic, reducing service time latency, and reducing resource server response delays that arise as a consequence of network slowdowns.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

What is claimed is:

1. A system for implementing a dual layer authentication for identity authentication or access control, comprising:
   a processor implemented server system communicably coupled with a primary identity authentication server, the server system comprising a plurality of resource servers and a secondary identity authentication server, wherein said server system communicates with the primary identity authentication server for initial verification of a primary access token while subsequent verification is implemented through the secondary identity authentication server, and is configured to:
   receive, at a first resource server within the server system, a request for a first processor implemented service implemented by said first resource server;
   receive, at the first resource server, the primary access token generated by the primary identity authentication server corresponding to an identity of a requestor that has generated the request for the first processor implemented service;
   receive, at the first resource server, validation information transmitted by the primary identity authentication server, said validation information corresponding to the primary access token;
   responsive to the received validation information confirming validity of the primary access token, transmit, from the first resource server to the secondary identity authentication server, a request for generation of a secondary access token corresponding to the identity of the requestor that has generated the request for the first processor implemented service;

receive, at the first resource server, the secondary access token requested from and generated by the secondary identity authentication server; and transmit, to a second resource server within the server system, a request for a second processor implemented service implemented by said second resource server, the request comprising the secondary access token, wherein the secondary identity authentication server uses the secondary access token to verify the identity of the requestor, wherein a data throughput rate between the secondary identity authentication server and one or more of the plurality of resource servers within the server system is higher than a data throughput rate between the primary identity authentication server and the one or more of the plurality of resource servers within the server system.

2. The system as claimed in claim 1, wherein the server system is configured such that:

the first resource server transmits to the second resource server:

the request for the second processor implemented service implemented by said second resource server; and the secondary access token;

the second resource server:

receives validation information transmitted by the secondary identity authentication server, said validation information corresponding to the secondary access token; and responsive to the received validation information confirming validity of the secondary access token, implements one or more processes associated with the second processor implemented service requested from the second resource server.

3. The system as claimed in claim 1, wherein each of the plurality of resource servers comprises a processor implemented instance of a logical server configured to implement a discrete logical application.

4. The system as claimed in claim 1 wherein the first resource server is configured to receive the request for the first processor implemented service from a terminal device communicably coupled to the system.

5. The system as claimed in claim 1, wherein the validation information corresponding to the primary access token is received by the first resource server in response to a first validation request sent to the primary identity authentication server from the first resource server.

6. The system as claimed in claim 1, wherein the request for generation of the secondary access token transmitted from the first resource server to the secondary identity authentication server is accompanied by transmission of the primary access token from the first resource server to the secondary identity authentication server.

7. The system as claimed in claim 1, wherein the secondary access token is generated by the secondary identity authentication server responsive to the secondary identity authentication server receiving, from the primary identity authentication server, confirmation of validity of the primary access token.

8. The system as claimed in claim 7, wherein the confirmation of validity of the primary access token is received from the primary identity authentication server at the secondary identity authentication server in response to a second validation request sent to the primary identity authentication server from the second identity authentication server.

9. The system as claimed in claim 1, wherein the primary identity authentication server is external to the server system and is communicably coupled with the server system.

10. The system as claimed in claim 1, wherein instances of the server system are configured for at least one of: load balancing, load distribution, servicing local data centers, servicing local data clusters, servicing localized network regions.

11. The system as claimed in claim 1, wherein the secondary access token defines one or more secondary token access permissions that are identical to or based on one or more primary token access permissions defined by the primary access token.

12. A method for implementing a dual layer authentication for identity authentication or access control, wherein a server system communicates with a primary identity authentication server for initial verification of a primary access token while subsequent verification is implemented through a secondary identity authentication server, the method comprising:

receiving, at a first resource server within the server system, a request for a first processor implemented service implemented by said first resource server, the server system comprising a plurality of resource servers and the secondary identity authentication server;

receiving, at the first resource server, the primary access token generated by the primary identity authentication server corresponding to an identity of a requestor that has generated the request for the first processor implemented service, wherein the primary identity authentication server is communicably coupled with the server system;

receiving, at the first resource server, validation information transmitted by the primary identity authentication server, said validation information corresponding to the primary access token;

responsive to the received validation information confirming validity of the primary access token, transmitting, from the first resource server to the secondary identity authentication server within the server system, a request for generation of a secondary access token corresponding to the identity of the requestor that has generated the request for the first processor implemented service;

receiving, at the first resource server, the secondary access token requested from and generated by the secondary identity authentication server; and transmitting, to a second resource server within the server system, a request for a second processor implemented service implemented by said second resource server, the request comprising the secondary access token, wherein the secondary identity authentication server uses the secondary access token to verify the identity of the requestor, wherein a maximum data transmission rate between the secondary identity authentication server and one or more of the plurality of resource servers within the server system is higher than a maximum data transmission rate between the primary identity authentication server and the one or more of the plurality of resource servers within the server system.

13. The method as claimed in claim 12, wherein:
the first resource server transmits to the second resource server:
the request for the second processor implemented service implemented by said second resource server; and
the secondary access token;
and
the second resource server:
receives validation information transmitted by the secondary identity authentication server, said validation information corresponding to the secondary access token; and
responsive to the received validation information confirming validity of the secondary access token, implements one or more processes associated with the second processor implemented service requested from the second resource server.

14. The method as claimed in claim 12, wherein each of the plurality of resource servers comprises a processor implemented instance of a logical server configured to implement a discrete logical application.

15. The method as claimed in claim 12, wherein the first resource server is configured to receive the request for the first processor implemented service from a terminal device communicably coupled to the server system.

16. The method as claimed in claim 12, wherein the validation information corresponding to the primary access token is received by the first resource server in response to a first validation request sent to the primary identity authentication server from the first resource server.

17. The method as claimed in claim 12, wherein the request for generation of the secondary access token transmitted from the first resource server to the secondary identity authentication server is accompanied by transmission of the primary access token from the first resource server to the secondary identity authentication server.

18. The method as claimed in claim 12, wherein the secondary access token is generated by the secondary identity authentication server responsive to the secondary identity authentication server receiving, from the primary identity authentication server, confirmation of validity of the primary access token.

19. The method as claimed in claim 18, wherein the confirmation of validity of the primary access token is received from the primary identity authentication server at the secondary identity authentication server, in response to a second validation request sent to the primary identity authentication server from the second identity authentication server.

20. One or more non-transitory computer storage media having computer-executable instructions for implementing a dual layer authentication for identity authentication or access control in which a server system communicates with a primary identity authentication server for initial verification of a primary access token while subsequent verification is implemented through a secondary identity authentication server, the computer-executable instructions, upon execution by a processor, cause the processor to at least:
receive, at a first resource server within the server system, a request for a first processor implemented service implemented by said first resource server, the server system comprising a plurality of resource servers and the secondary identity authentication server;
receive, at the first resource server, the primary access token generated by the primary identity authentication server corresponding to an identity of a requestor that has generated the request for the first processor implemented service;
receive, at the first resource server, validation information transmitted by the primary identity authentication server, said validation information corresponding to the primary access token;
responsive to the received validation information confirming validity of the primary access token, transmit, from the first resource server to the secondary identity authentication server, a request for generation of a secondary access token corresponding to the identity of the requestor that has generated the request for the first processor implemented service;
receive, at the first resource server, the secondary access token requested from and generated by the secondary identity authentication server; and
transmit, to a second resource server within the server system, a request for a second processor implemented service implemented by said second resource server, the request comprising the secondary access token, wherein the secondary identity authentication server uses the secondary access token to verify the identity of the requestor,
wherein a data throughput rate between the secondary identity authentication server and one or more of the plurality of resource servers within the server system is higher than a data throughput rate between the primary identity authentication server and the one or more of the plurality of resource servers within the server system.

* * * * *